United States Patent
Olin et al.

[11] Patent Number: 6,016,460
[45] Date of Patent: Jan. 18, 2000

[54] INTERNAL COMBUSTION ENGINE CONTROL WITH MODEL-BASED BAROMETRIC PRESSURE ESTIMATOR

[75] Inventors: Peter M. Olin, Ann Arbor; Peter James Maloney, New Hudson, both of Mich.

[73] Assignee: General Motors Corporation, Detroit, Mich.

[21] Appl. No.: 09/174,234

[22] Filed: Oct. 16, 1998

[51] Int. Cl.[7] .................................................... F02D 45/00
[52] U.S. Cl. ....................... 701/102; 73/117.3; 73/118.2
[58] Field of Search ................................... 701/102, 114; 73/117.3, 118.2

[56] References Cited

U.S. PATENT DOCUMENTS

| 4,926,335 | 5/1990 | Flowers | 701/102 |
| 5,012,422 | 4/1991 | Takahashi et al. | 701/106 |
| 5,070,846 | 12/1991 | Dudek et al. | 123/488 |
| 5,615,657 | 4/1997 | Yoshizawa | 123/494 |

*Primary Examiner*—Andrew M. Dolinar
*Attorney, Agent, or Firm*—Vincent A. Cichosz

[57] ABSTRACT

An improved engine control utilizes a model-based technique to obtain an accurate estimate of barometric pressure with significantly reduced calibration time and effort. A mathematical model of mass air flow through the engine intake system is used to estimate the pressure ratio across the intake system as a function of mass air flow, the effective intake area, and the intake air pressure and temperature. The barometric pressure is then determined from the estimated ratio, and used in the calculation of various gas flows for control purposes. The mass air flow information may be provided by a mass air flow sensor, or alternatively, may be determined based on engine flow rate estimations. Because the estimation is model-based, no special calibration is needed to ensure accuracy at high altitudes.

10 Claims, 6 Drawing Sheets

INTERNAL COMBUSTION ENGINE CONTROL WITH MODEL-BASED BAROMETRIC PRESSURE ESTIMATOR

TECHNICAL FIELD

This invention relates to the control of an internal combustion engine based on an estimate of barometric pressure, including a model-based control method for accurately estimating the barometric pressure.

BACKGROUND OF THE INVENTION

Knowledge of the barometric, or atmospheric, pressure is desired in order to accurately perform control and diagnostic functions of an automotive power plant, including fuel injection and vapor purge controls. Although the barometric pressure may be measured directly with a dedicated sensor, many automotive manufacturers have relied on an estimate of the barometric pressure in order to save the cost of the sensor. The pressure estimation is typically based on the measured intake manifold pressure, with a variable adjustment or offset heuristically determined in relation to engine operating parameters such as speed and load. While this approach eliminates the sensor, the accuracy of the estimate tends to vary with operating conditions, and extensive calibration is required in order to provide acceptable accuracy at high altitudes. Accordingly, what is needed is an approach that is accurate over a wide range of operation and that requires only minimal effort to calibrate.

SUMMARY OF THE INVENTION

The present invention is directed to an improved engine control utilizing a model-based technique to obtain an accurate estimate of barometric pressure with significantly reduced calibration time and effort. According to the invention, a mathematical model of mass air flow through the engine intake system is used to estimate the pressure ratio across the intake system (that is, the ratio of barometric pressure to intake manifold pressure) as a function of mass air flow, the effective intake area, the intake manifold pressure and the intake air temperature. The barometric pressure is then determined from the estimated ratio, and used in the calculation of various gas flows for control purposes.

According to a first embodiment of this invention, the mass air flow information is provided by a mass air flow sensor. In a second embodiment, the mass air flow information is determined based on engine flow rate estimations. In a preferred implementation, simple 2-D look-up tables are used to determine the effective intake area based on throttle and idle air control (if applicable) position, and a single 3-D look-up table is used to estimate the pressure ratio across the intake system as a function of effective intake area and mass air flow parameters. Because the estimation is model-based, no special calibration is needed to ensure accuracy at high altitudes.

DESCRIPTION OF THE PREFERRED EMBODIMENT

Figure 1:
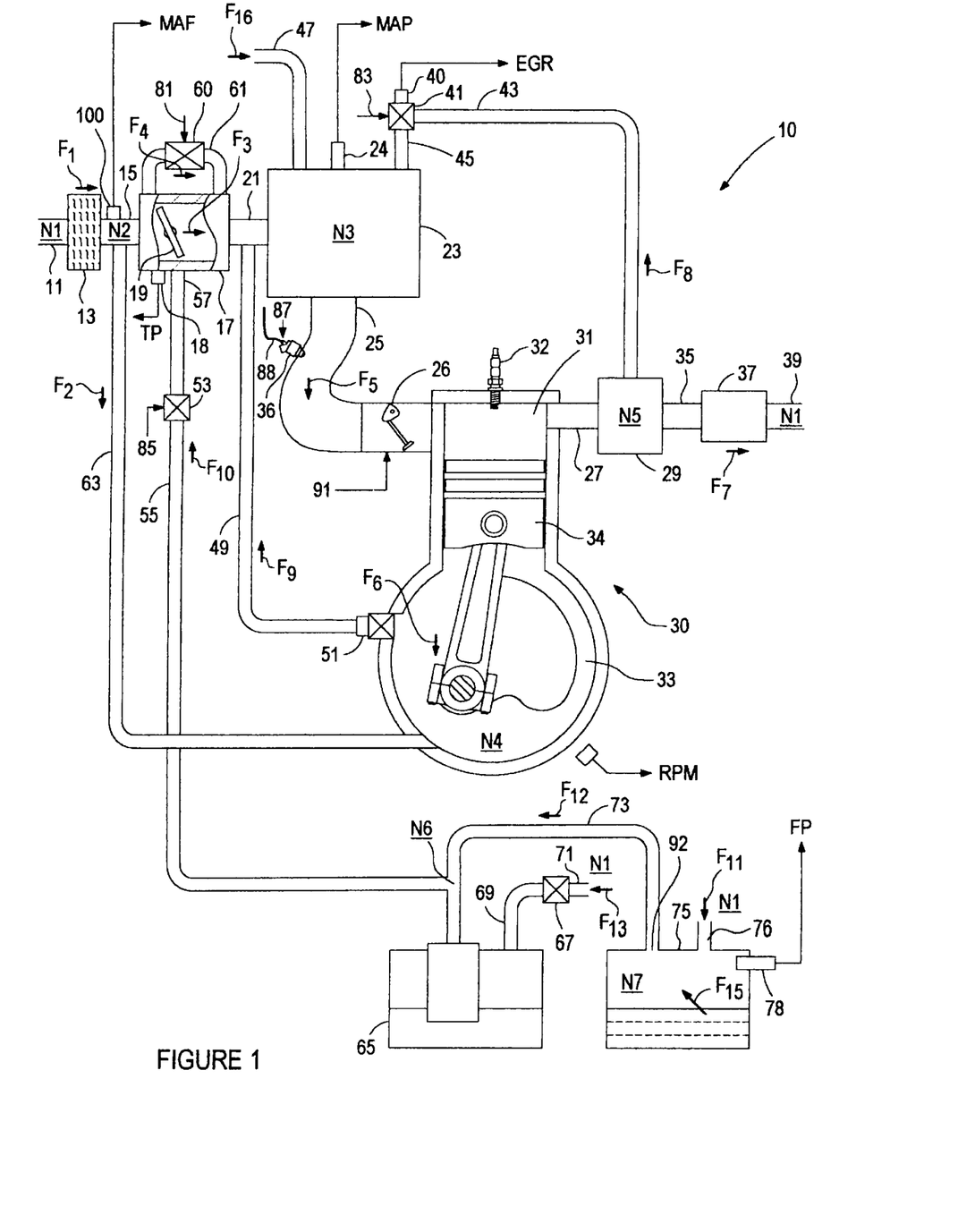
FIG. 1 is a schematic diagram of an internal combustion engine system and controller according to this invention.
Figure 2:
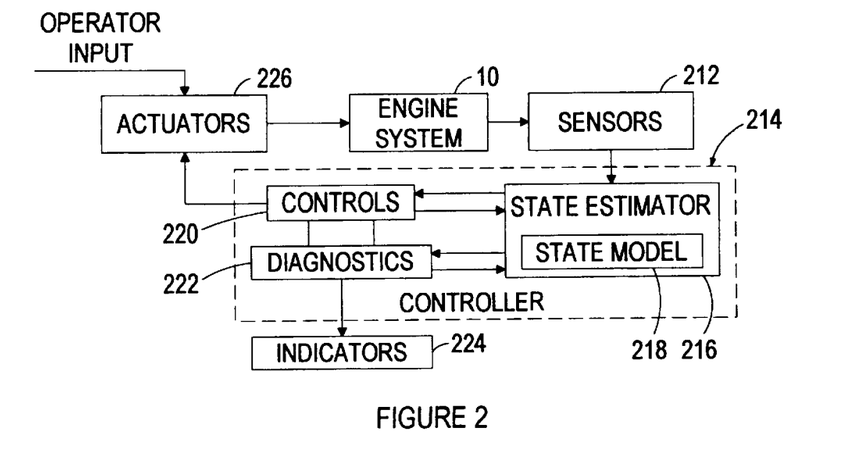
FIG. 2 is a general signal flow diagram illustrating an engine system control and diagnostic network for estimating pneumatic states and for controlling and diagnosing the engine system of FIG. 1.

In FIGS. 1 and 2, the reference numeral 10 generally designates a conventional internal combustion engine system. The engine system 10 includes various sensors and actuators, described in reference to FIG. 1, which are coupled to an electronic controller (Controller 214) as diagramatically shown in FIG. 2.

Referring to FIG. 1, the engine system 10 is diagrammed as an interdependent network of gas mass flows designated by arrows labeled $F_1$–$F_{16}$ between a network of pneumatic volume nodes designated as N1–N7. Inlet air at atmospheric, or barometric, pressure $P_{at}$ at node N1 passes through fresh air inlet 11, through air cleaner 13 and into intake duct 15 at node N2. The inlet air is drawn through throttle body 17 in which is rotatably disposed a throttle plate 19, the position of which is manually or electronically controlled to vary restriction to inlet air passing through the throttle body 17. The position of throttle plate 19 is detected by the sensor 18 and provides as an input (TP) to the Controller 214. A portion of inlet air is routed past throttle plate 19 through conduits 59 and 61 and a conventional idle air bypass valve 60. The bypass valve 60 may be electrically controlled by an internal stepper motor (not shown) in response to an idle air command signal from the Controller 214 on line 81 under engine idle conditions when a precise control of relatively low intake airflow is required. As mentioned below, the position of the valve 60 may be known to the Controller 214 based on the number of incremental movements or steps of the bypass valve 60 from a known limit position. Airflow out of throttle body 17 is coupled through intake duct 21 into intake manifold 23 at node N3. A conventional pressure transducer 24 is exposed to gas pressure in the intake manifold 23 and provides a manifold absolute pressure (MAP) signal in accordance therewith on line 12.

Individual cylinder intake runners, one runner 25 being illustrated in FIG. 1, open into the intake manifold 23 and into the combustion chamber of respective engine cylinders, one combustion chamber 31 of one respective cylinder 30 being shown in FIG. 1. Each cylinder includes a combustion chamber 31 and crankcase 33, separated by a piston 34 which engages the inside wall of the cylinder. A quantity of fuel is injected into the intake runner 25 via conventional fuel injector 87 in response to a fuel injection command signal from the Controller 214 on line 88. The fuel mixes with the inlet air and is drawn into the combustion chamber 31 during a cylinder intake event during which an intake valve 26 is driven to an open position and during which a low pressure condition is present in the combustion chamber 31. The air-fuel mixture is ignited in the combustion chamber 31 during a combustion event initiated by a timed ignition arc across the spaced electrodes of spark plug 32 in response to the Controller 214. The piston 34 within the cylinder 30 is reciprocally driven under the effective pressure of the combustion event for driving vehicle wheels, accessory loads, etc., as is generally understood in the art. Gasses produced in the combustion process within the combustion chamber 31 are exhausted from the combustion chamber 31 during a cylinder exhaust event and through exhaust runner 27 to exhaust manifold 29 at node N5. The exhaust gasses pass through the exhaust manifold 29 to exhaust duct 35 leading to catalytic treatment device and muffler (generally illustrated as element 37) and then to the atmosphere at the pressure of node N1.

Vacuum is selectively applied to the cylinder crankcase 33 at node N4 through a positive crankcase ventilation (PCV) conduit 49 including a standard PCV valve 51, the PCV conduit being connected between the crankcase 33 and the intake duct 21. The intake vacuum serves to draw out blow-by gasses that have been driven from the cylinder combustion chamber 31 to the crankcase 33 under the pressure of the combustion process. A supply of fresh inlet air from node N2 is provided to the crankcase 33 via a fresh air conduit 63 connected between the intake duct 15 and the crankcase 33. The PCV valve selectively draws the blow-by gasses from the crankcase 33 for mixing with intake air for consumption in engine cylinders 30 for purifying engine system lubricants.

A portion of the exhaust gasses are drawn from the exhaust manifold 29 at node N5 through an exhaust gas recirculation (EGR) conduit 43 and across an EGR valve 41 and a conduit 45 into the intake manifold 23 at node N3 for mixing with inlet air for delivery to the engine cylinder combustion chambers. The EGR valve 41 is electrically operated by the Controller 214 via line 83 as is generally understood in the art in response to general operating conditions to vary the dilution of the fresh inlet air with substantially inert exhaust gas to provide for a reduction in the engine emissions component of oxides of nitrogen (NOx).

A pneumatic brake boost conduit 47 opens into intake manifold 23 at node N3 providing for a minor gas flow $F_{16}$ during application of the vehicle service brakes (not shown) as is well-known in the art.

Vehicles equipped with well-known evaporative emission controls may also have gas flow through a canister purge valve 53 and canister purge conduits 55 and 57 into throttle body 17 downstream of throttle plate 19. Charcoal canister 65 generally releases fuel vapors when fresh air is drawn through purge vent 67 and purge vent conduits 69 and 71. Fuel tank 75 may also release fuel vapors which may be absorbed in canister 65, may be released thereby, or may pass directly to the engine along with released fuel vapors through conduit 55 at node N6 for consumption in the described cylinder combustion process. Fuel tank 75 having a supply of fuel therein at node N7 may include a leak orifice 76 through which fresh air may enter the fuel tank. Conventional pressure transducer 78 is disposed within the fuel tank 75 and provides a fuel vapor pressure signal FP to the Controller 214 as shown. Fuel vapor passes from the fuel tank 75 through a conventional rollover orifice 92 and to the canister 65 via tank vapor recovery conduit 73.

Disposed between the above-escribed nodes are flow paths including flow path $F_1$ across the air cleaner 13 between nodes N1 and N2, flow path $F_2$ along PCV fresh air conduit 63 between nodes N2 and N4, flow path $F_3$ through throttle body 17 across the inlet air valve 19 from node N2 to intake duct 21, flow path $F_4$ through idle air bypass conduits 59 and 61, flow path $F_5$ through the intake runner 25 between node N3 and the cylinder combustion chamber 31, flow path $F_6$ between the combustion chamber and the crankcase (node N4) of an engine cylinder 30, flow path $F_7$ to the atmosphere at node N1 through catalytic treatment device and muffler elements 37 and exhaust ducts 35 and 39, flow path $F_8$ through EGR conduits 43 and 45 between node N5 and the EGR valve 41, flow path $F_9$ through the PCV conduit 49 between node N4 and the intake duct 21 (effectively at node N3), flow path $F_{10}$ through the conduit 55 between node N6 and the throttle body 17 (effectively at node N3), flow path $F_{11}$ through leak orifice 76 into fuel tank 75 between nodes N1 and N7, flow path $F_{12}$ from fuel tank 75 across rollover valve 92 and through conduit 73 between nodes N7 and N6, flow path $F_{13}$ across purge vent 67 into purge canister 65 between nodes N1 and N6, fuel vaporization flow path $F_{15}$ within fuel tank 75, and flow path $F_{16}$ through the brake boost conduit 47 between the braking system (not shown) and the node N3.

The intake system airflow through air inlet 11 is referred to herein as the intake flow $MAF_{int}$. The total effective area of the intake system, $A_{int}$, is the sum of the effective throttle body area $A_{thr}$ and the effective idle air control area $A_{iac}$. The effective area $A_{thr}$ of the throttle body 17 may be defined as a function of the position of throttle plate 19, and the effective area $A_{iac}$ of the idle air bypass valve 60 may be defined as a function of the position of the bypass valve 60. Mathematically, this may be expressed as:

$$A_{int} = A_{thr}(TP) + A_{iac}(I)$$

where TP is the throttle position signal discussed above and I is the net number of stepper motor steps commanded by the Controller 214.

The intake mass air flow $MAF_{int}$ is a function of the effective area $A_{int}$, the barometric pressure $P_{AT}$, the intake air temperature $T_{AT}$, and the pressure ratio $MAP/P_{AT}$, and maybe mathematically expressed as:

$$MAF_{int} = [A_{int} * P_{AT}/(R*T_{AT})^{1/2}] \Phi(MAP/P_{AT})$$

where R is the universal gas constant for air. The above equations may be advantageously re-arranged and solved for the ratio $P_{AT}/MAP$ to yield:

$$P_{AT}/MAP = \Pi([MAF_{int}*(R*T_{AT})^{1/2}MAP], A_{int})$$

where ø is a non-linear function of $[MAF_{int}*(R*T_{AT})^{1/2}/MAP]$ and $A_{int}$ that can be determined empirically using standard test procedures at any elevation.

According to this invention, the barometric pressure $P_{AT}$ may be estimated using the above described model by solving for the ratio $P_{AT}/MAP$ and multiplying the result by the measured intake pressure MAP. In a first embodiment, a conventional mass air flow sensor 100 (used for engine control in many automotive control systems) disposed just downstream of the air cleaner 13 is used to measure the intake mass air flow $MAF_{int}$, while in a second embodiment, estimated airflows in flow paths $F_5$, $F_8$ and $F_{10}$ are used to estimate the intake mass air flow $MAF_{int}$. In both embodiments, a temperature sensor (not shown) provides the air temperature $T_{AT}$, and the pressure sensor 24 provides the intake pressure MAP.

FIG. 2 is a general block diagram of the system 10 of FIG. 1, including an engine 210, sensors 212, and the Controller 214 which controls the engine operation. As applied to the second embodiment of this invention, the Controller 214 additionally carries out a sequence of state estimator operations for estimating pressures of interest at certain of the nodes of FIG. 1, and for determining mass flow rates through certain of the flow branches of FIG. 1. To this end, a state model 218 for modeling such pressures and flows is included with the state estimator 216. As described below, the flow outputs are used to estimate the intake mass air flow $MAF_{int}$ for the purpose of estimating the barometric pressure $P_{AT}$, which in turn, is used in conjunction with the flow and pressure estimators to schedule engine fueling and various other controls, as indicated by the block 220. The pressure and flow information may also be used in various diagnostic procedures 222 for diagnosing certain engine control systems. The controls 220 issue control signals to drive various engine system control actuators 226, such as fuel injectors 87, idle air bypass valve 60, EGR valve 41, etc. in accordance with generally available control strategies. Manual operator inputs may further be applied to such actuators, as is generally understood in the art. The diagnostics 222 interact with the controls according to standard control and diagnostic procedures and may provide diagnostic information to various conventional indicators 224, such lamps or chimes. The Controller 214 may take the form of a conventional single-chip micro-controller including such conventional elements as a central processing unit, an input-output unit, and memory devices including random access memory RAM devices, read only memory ROM devices and other standard elements.

Figure 3:
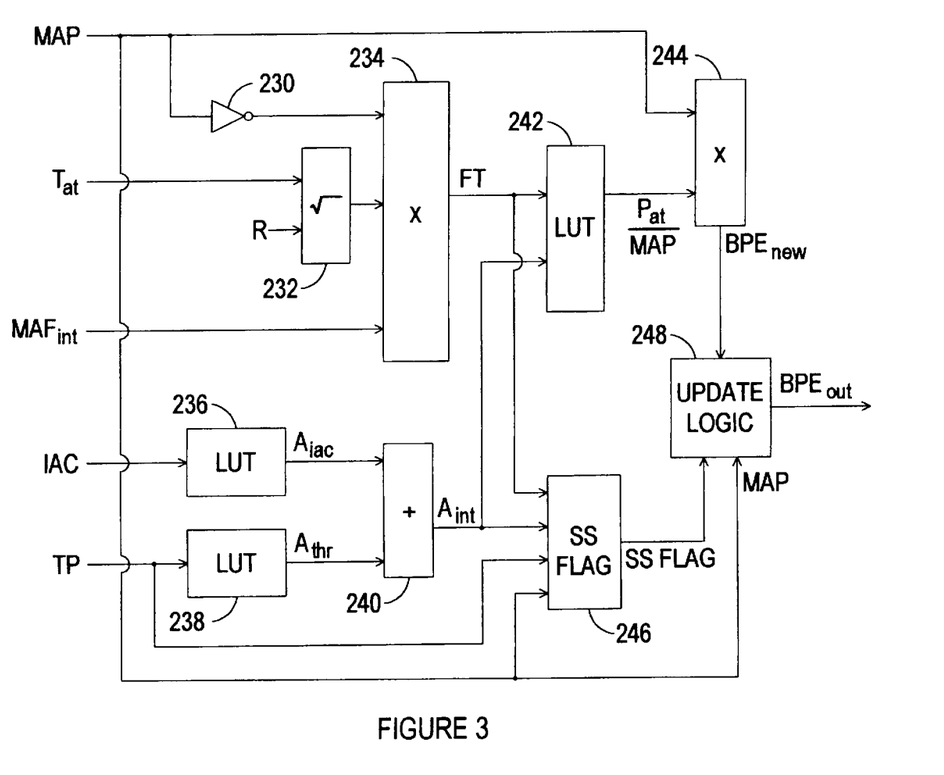
FIGS. 3, 4 and 5 together comprise a block diagram of a barometric pressure estimation method according to a first embodiment of this invention.
Figure 4:
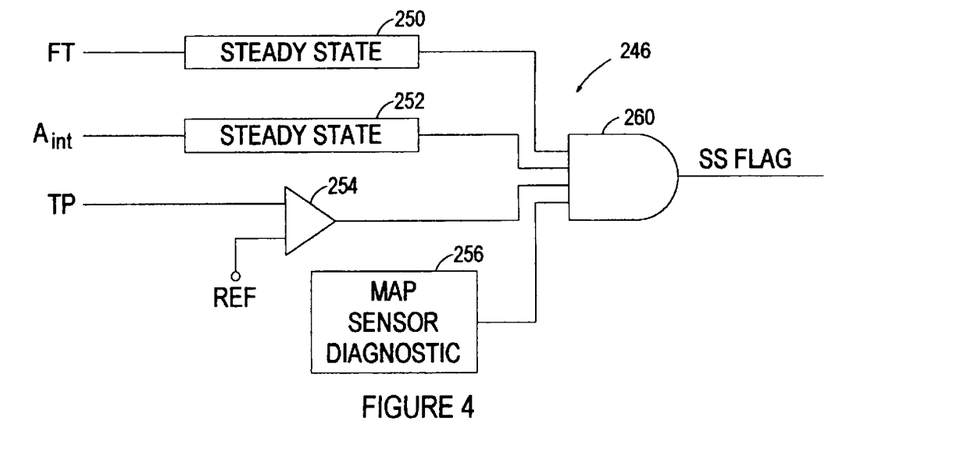
Figure 5:
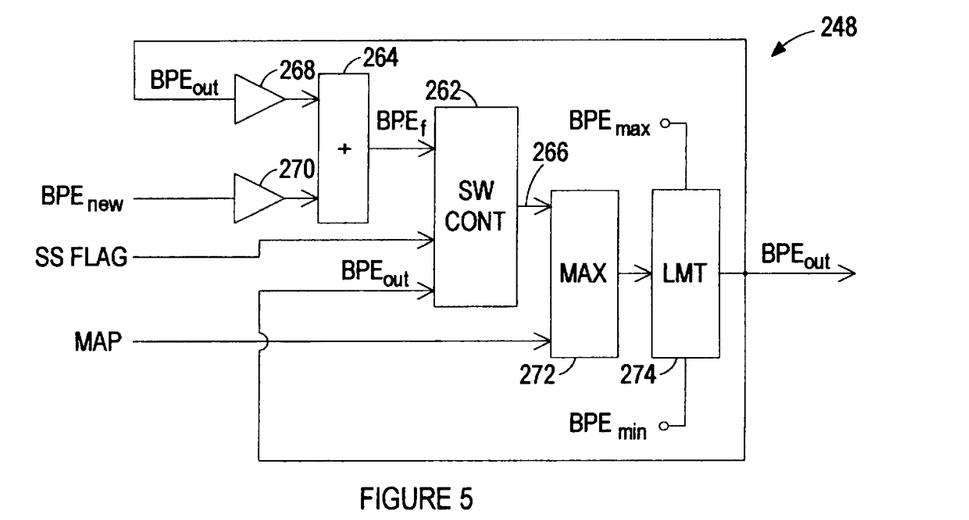

FIGS. 3–5 depict a block diagram of the barometric pressure estimation portion of the control, according to the first embodiment where a mass air flow sensor 100 is used to measure the intake mass air flow $MAF_{int}$. Referring to FIG. 3, it is seen that the system inputs include the manifold absolute pressure MAP, the intake or ambient air temperature $T_{AT}$, the intake mass air flow $MAF_{int}$, the idle air control position IAC, and the throttle position TP. The elements 230–234 combine the flow related terms (FT) as a function of inverse MAP, $T_{AT}$, $MAF_{int}$ and the universal gas constant for air R. Thus, the inverter element 230 inverts the MAP signal, the square-root element 232 forms the quantity $(R^*T_{AT})^{1/2}$, and the multiplier element forms the quantity $[MAF_{int}^*(R^*T_{AT})^{1/2}]/MAP$. The elements 236–240 form the effective intake area term $A_{int}$ as defined above. Thus, the look-up table (LUT) element 236 provides the effective idle bypass area $A_{iac}$, as a function of the IAC input, the look-up table (LUT) element 238 provides the effective throttle area $A_{thr}$ as a function of the TP input, and the adder element forms the total effective intake area $A_{int}$ as the sum of $A_{thr}$ and $A_{iac}$. The flow term FT and the total effective intake area $A_{int}$ are provided as inputs to the 3D look-up table (LUT) element 242, which effectuates the non-linear ø-function described above. Thus, the output of element 242 is the pressure ratio $P_{AT}/MAP$. The multiplier element 244 forms the product $MAP[P_{AT}/MAP]$ to provide the estimate of barometric pressure, designated in FIG. 3 as $BPE_{new}$. The element 246, described below in reference to FIG. 4, determines the status of a Steady State flag, and the element 248, described below in reference to FIG. 5, provides update logic to update the barometric pressure output value $BPE_{out}$.

Referring to FIG. 4, the status of the Steady State flag is determined based on four inputs: flow parameter FT, intake area $A_{int}$, throttle position TP, and a MAP sensor diagnostic 256. The blocks 250–258 check the condition of the various inputs, and provide inputs to AND-gate 260. If the various conditions defined by blocks 250–258 are satisfied, the SS Flag output of AND-gate 260 provides an indication to Update Logic element 248 that $BPE_{new}$ is valid and may be used to update $BPE_{out}$. If any of the conditions are not satisfied, the SS Flag output of AND-gate 260 indicates to Update Logic element 248 that $BPE_{new}$ should not be used to update $BPE_{out}$. The blocks 250 and 252 determine if the respective input values FT and $A_{int}$ are in an apparent steady state condition. This may be determined by filtering the input value, and comparing the filtered version to the current input value to determine if the input is changing by more than a predefined rate. If a steady state condition is detected (i.e., input rate of change less than a predefined rate) the respective elements 250, 252 provide a logic one output to AND-gate 260. The compare element 254 compares the TP input to a reference value (for example, corresponding to 30% open throttle position) and provides a logic one input to AND-gate 260 if TP exceeds the reference value. Thus, if TP is less than the reference value, $BPE_{new}$ is not used to update $BPE_{out}$. The MAP sensor diagnostic 256 develops a flag output based on a diagnostic evaluation of the MAP sensor 24, and supplies a logic one input to AND-gate 260 if proper operation of the MAP sensor 24 is confirmed.

Referring to FIG. 5, the Update Logic element 248 receives $BPE_{new}$, the SS Flag and MAP as inputs, and provides $BPE_{out}$ as an output. The element 262 is a two input switch controlled by the status of the SS Flag. When the SS Flag is set, indicating that $BPE_{new}$ is valid and may be used to update $BPE_{out}$, the switch allows the output of adder element 264 to appear on line 266. When the SS Flag is cleared, indicating that $BPE_{new}$ should not be used to update $BPE_{out}$, the switch applies $BPE_{out}$ to line 266. The adder element 264, along with gain elements 268 and 270, form an updated or filtered version of the pressure estimate (referred to in FIG. 5 as $BPE_f$) in which a specified fraction of $BPE_{new}$ is added to a specified fraction of $BPE_{out}$. Mathematically, the filter may be expressed as:

$$BPE_f = (G1^* BPE_{new}) + (1-G1)^* BPE_{out}$$

where G1 is a gain term applied by gain element 270 and (1−G1) is a gain term applied by gain element 268. The element 272 compares the output of switch 262 to the MAP value, and supplies the larger of the tvo as an input to limit element 274; this recognizes that the actual barometric pressure is always at least as great as the intake manifold pressure MAP. The limit block 274 limits the output of block 272 to a range of values bounded by maximum and minimum reference values $BPE_{max}$ and $BPE_{min}$, the output of block 274 forming the output estimate $BPE_{out}$.

Figure 6:
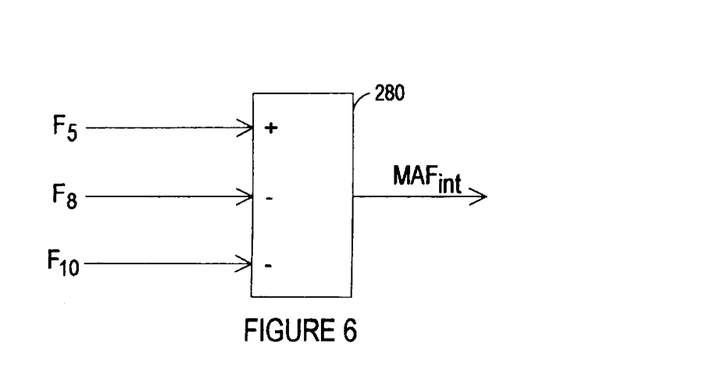
FIG. 6 is a block diagram depicting an alternate barometric pressure estimation method according to a second embodiment of this invention.

The diagram of FIG. 6 generally depicts a mechanization according to the second embodiment of this invention where the intake mass air flow $MAF_{int}$ is determined not by a mass air flow sensor, but by a combination of various estimated flows within the engine system 10. This, of course, eliminates the requirement of a mass air flow sensor, and it particularly useful in systems that utilize a speed-density technique to schedule engine fueling. In general, the intake system flow $MAF_{int}$ can be calculated for steady-state conditions in the intake manifold as $$MAF_{int} = MAF_{eng} - MAF_{non-int}$$

where $MAF_{eng}$ is the mass flow into the engine (designated in FIG. 1 as $F_5$) and $MAF_{non-int}$ is the sum of any flows into the intake manifold which do not pass through the intake system. In the illustrated embodiment, such non-intake flows include the purge valve flow (designated in FIG. 1 as $F_{10}$) and the EGR valve flow (designated in FIG. 1 as $F_8$). Flows $F_{16}$ and $F_9$ attributable to the pneumatic brake boost system and the PCV valve 51 are neglected due to their relatively small magnitudes. Thus, the intake system flow $MAF_{int}$ is formed in adder element in accordance with the engine flow $F_5$ less the EGR flow $F_8$ and the purge valve flow $F_{10}$.

The flows $F_5$, $F_8$ and $F_{10}$ are determined in accordance with a state estimator technique in which the various flow rates identified in FIG. 1 are estimated based on corresponding pressure ratios (including the barometric pressure estimate described above), the flow rates are used to determine net flows in the various nodes identified in FIG. 1, the net flows are used to estimate the pressure change at the various nodes, and the estimated pressure changes are integrated to provide pressure estimates for the next computation cycle. The flow and pressure information is then applied in general engine system control and diagnostic operations.

Figure 7:
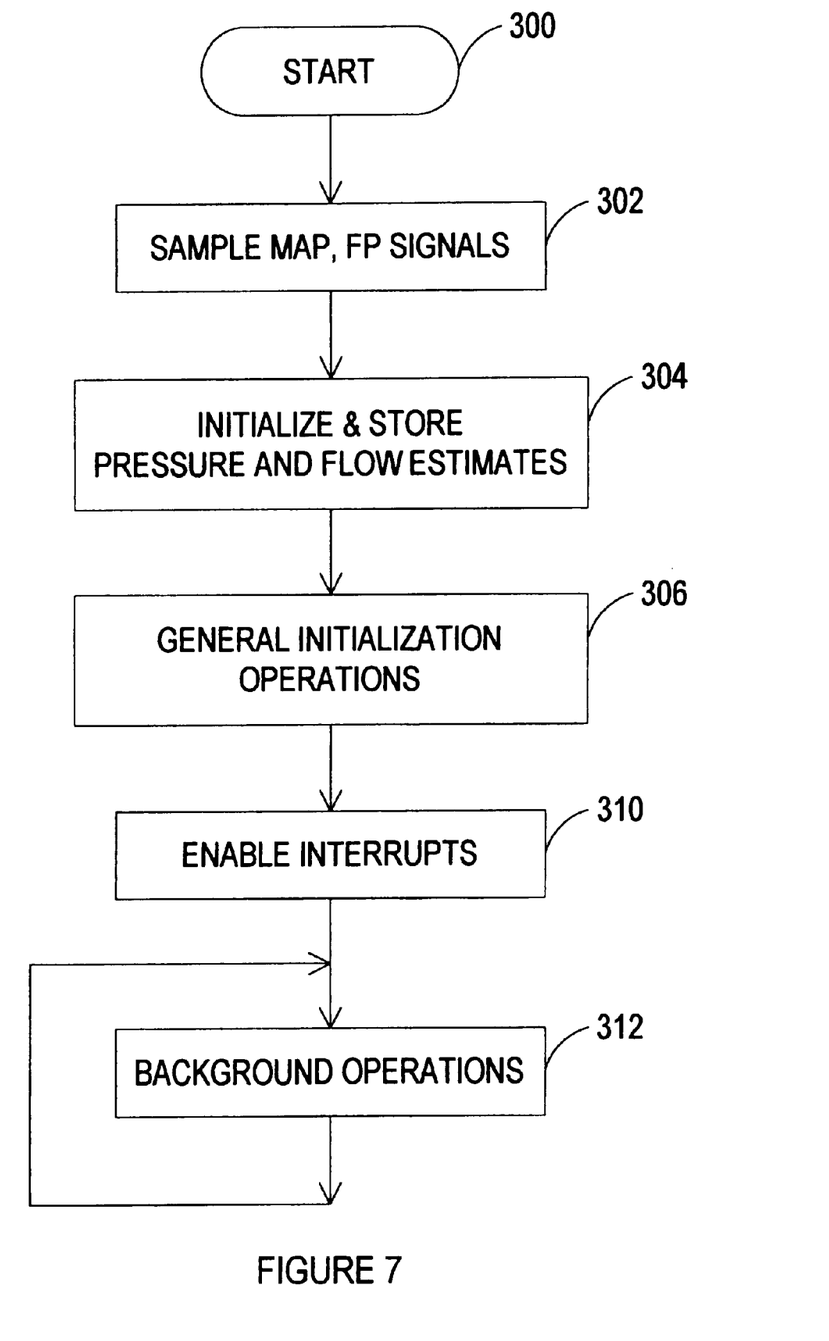
FIGS. 7, 8 and 9 are computer flow diagrams illustrating a flow of operations of the controller of FIG. 1 for carrying out the control of this invention.
Figure 8:
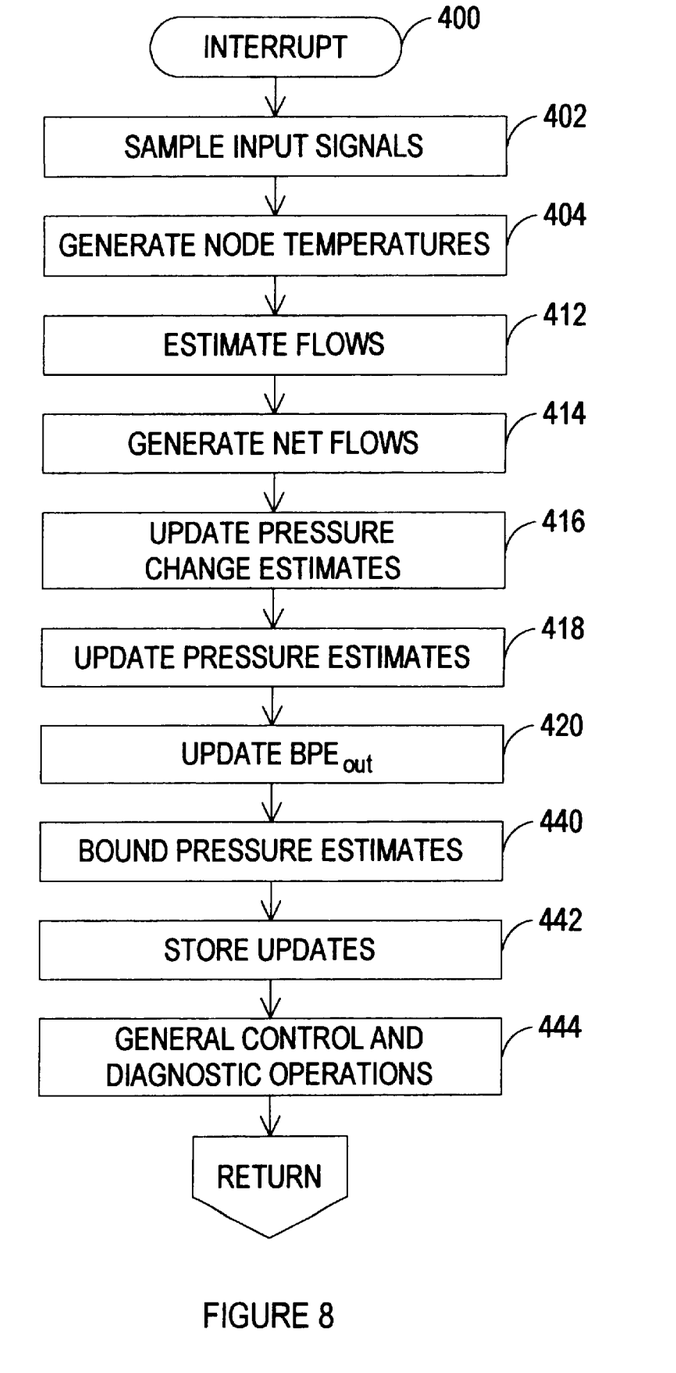
Figure 9:
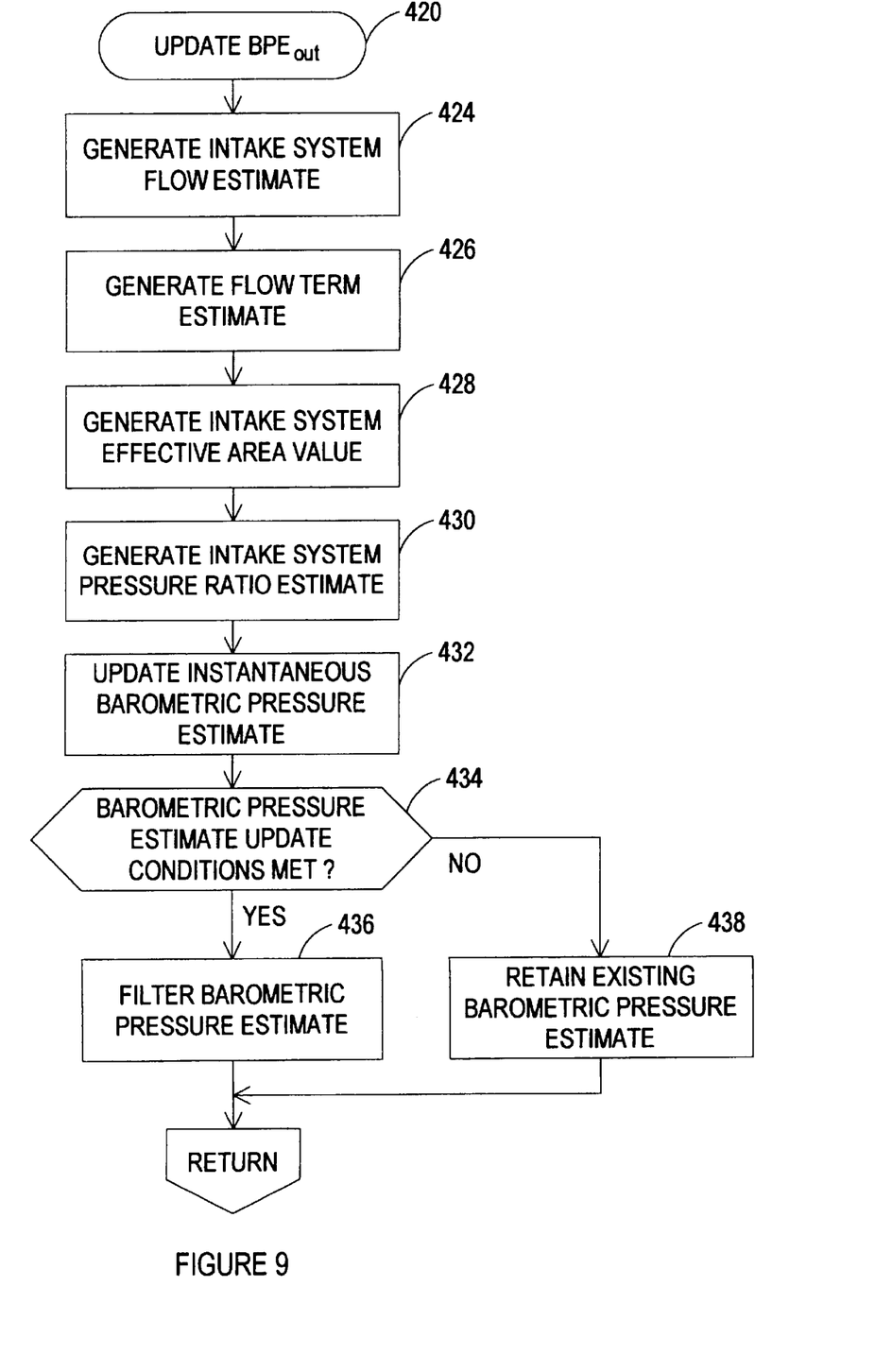

FIGS. 7–9 represent computer program instructions executed by the Controller 214 of FIG. 2 in carrying out a control in accordance with the second embodiment of this invention in which the intake airflow is estimated based on related airflows determined by a state estimator. Of course, the control is greatly simplified when carried out in accordance with the first embodiment, where the intake airflow is measured by mass air flow sensor 100, and the state estimator is not required.

Referring to FIG. 7, block 300 designates an initialization routine executed at the start of an engine system ignition cycle. Following initialization, the block 302 is executed to sample the MAP and FP pressure signals of sensors 24 and 78. Block 304 is then executed to initialize pressure and flow estimate information as follows:

$$P_{at}(t)=P_{im}(t)=P_{em}(t)=P_{ec}(t)=MAP;$$

$$P_{ft}(t)=FP; \text{ and}$$

$$f_{thr}(t)=f_{iac}(t)=f_{egr}(t)=f_{eng}(t)=f_{exh}(t)=f_{prg}(t)=f_{rol}(t)=f_{lv}(t)=f_{vnt}(t)=0,$$

in which $P_{at}(t)$ is estimated atmospheric (barometric) pressure at time t, $P_{im}(t)$ is estimated intake manifold pressure at node N3 at time t, $P_{em}(t)$ is estimated exhaust manifold pressure at node N5 at time t, $P_{ec}(t)$ is estimated evaporative canister 65 pressure at node N6 at time t, $P_{ft}(t)$ is estimated fuel tank pressure at node N7 at time t, $f_{thr}(t)$ is gas flow rate across the throttle plate 19 (flow branch $F_3$) at time t, $f_{iac}(t)$ is gas flow rate across the idle air valve 60 (flow branch $F_4$) at time t, $f_{egr}(t)$ is gas flow rate through the EGR conduit 43 (flow branch $F_8$) at time t, $f_{eng}(t)$ is gas flow through the engine cylinder intake runner 25 (flow branch $F_5$) at time t, $f_{exh}(t)$ is gas flow through exhaust duct 35 (flow branch $F_7$) at time t, $f_{prg}(t)$ is gas flow across the purge valve 53 (flow branch $F_{10}$) at time t, $f_{rol}(t)$ is gas flow across the rollover orifice 92 (flow branch $F_{12}$) at time t, $f_{lv}(t)$ is gas vaporization and leak flow within the fuel tank 75 (flow branches $F_{11}$ and $F_{15}$) at time t, $f_{vnt}(t)$ is gas flow through the vent valve 67 (flow branch $F_{13}$) at time t, and wherein t is currently set to zero (at engine system startup).

The block 306 is then executed to carry out any required general initialization operations including such well-known startup operations as operations to clear memory locations, to transfer data and program instructions from ROM devices to RAM devices, and to set pointers, counters and constants to initial values. Numerous time and event based interrupts are next enabled at block 310 to occur following certain time intervals, or following certain engine system events such as cylinder top dead center events whereby interrupt service operations are carried out following such interrupts to provide for synchronous and asynchronous engine system control, diagnostic and maintenance operations. Background operations are then carried out at block 312 including general, low priority maintenance and diagnostic operations, including operations to diagnose the engine system through application of the pneumatic state estimation information provided by the state estimator 216 of FIG. 2.

FIG. 8 depicts a series of operations for servicing a timer or event based interrupt 400 enabled at block 310 of FIG. 7. Following each such interrupt occurrence, after temporarily suspending any ongoing controller operations of lower priority in a pre-established priority hierarchy, the block 402 samples input signals including MAP, TP, RPM, and FP of FIG. 1. Temperature estimation operations are next carried out at block 404, including operations for directly measuring or estimating gas temperature at various nodes within the engine system 10, including at nodes N1, N3, N5, N6, and N7 of FIG. 1. For example, the temperature estimation operations described in the disclosure of copending U.S. patent application Ser. No. 08/862,074, filed May 22, 1997, assigned to the assignee of this application and hereby incorporated herein by reference, may be carried out at block 404 with respect to such nodes.

The block 412 then determines various gas flow estimates as follows:

$$f_{thr}(t) = f_{thr}^{std}\left(\frac{P_{im}(t)}{P_{at}(t)}, TP\right) \cdot Cp(P_{at}(t)) \cdot Ct(T_{at}(t)),$$

$$f_{iac}(t) = f_{iac}^{std}\left(\frac{P_{im}(t)}{P_{at}(t)}, IAC\right) \cdot Cp(P_{at}(t)) \cdot Ct(T_{at}(t)),$$

$$f_{egr}(t) = f_{egr}^{std}\left(\frac{P_{im}(t)}{P_{em}(t)}, EGR\right) \cdot Cp(P_{em}(t)) \cdot Ct(T_{em}(t)),$$

$$f_{eng}(t) = f_{eng}^{std}\left(\frac{P_{em}(t)}{P_{im}(t)}, RPM\right) \cdot Cp(P_{im}(t)) \cdot Ct(T_{im}(t)),$$

$$f_{exh}(t) = f_{exh}^{std}\left(\frac{P_{at}(t)}{P_{em}(t)}\right) \cdot Cp(P_{em}(t)) \cdot Ct(T_{em}(t)),$$

$$f_{prg}(t) = f_{prg}^{std}\left(\frac{P_{im}(t)}{P_{ec}(t)}\right) \cdot Cp(P_{ec}(t)) \cdot Ct(T_{ec}(t)),$$

$$f_{rol}(t) = f_{rol}^{std}\left(\frac{P_{ec}(t)}{P_{ft}(t)}\right) \cdot Cp(P_{ft}(t)) \cdot Ct(T_{ft}(t)),$$

$$f_{vnt}(t) = f_{vnt}^{std}\left(\frac{P_{ec}(t)}{P_{at}(t)}\right) \cdot Cp(P_{at}(t)) \cdot Ct(T_{at}(t)), \text{ and}$$

$$f_{lv}(t) = f_{lv}(t-1) + h \cdot \dot{f}_{lv},$$

wherein the term $f_{lv}(-1)$ is initialized to zero, such as at block 304, and the gas mass flow rate at flow path $F_{15}$, termed $f_{lv}(t)$, is determined as follows:

$$f_{lv}(t)=K_{lv}[FP(t)-P_{ft}(t)],$$

with FP(t) being the measured fuel vapor pressure within the fuel tank 75 at time t, and in which:

$$f_{thr}^{std}\left(\frac{P_{im}(t)}{P_{at}(t)}, TP\right)$$

is a calibrated 3D lookup table having entries representing standard gas flow past throttle plate 19;

$$f_{iac}^{std}\left(\frac{P_{im}(t)}{P_{at}(t)}, IAC\right)$$

is a calibrated 3D lookup table having entries representing standard gas flow through the IAC valve 60;

$$f_{egr}^{std}\left(\frac{P_{im}(t)}{P_{em}(t)}, EGR\right)$$

is a calibrated 3D lookup table having entries representing standard gas flow through the EGR valve 41;

$$f_{eng}^{std}\left(\frac{P_{em}(t)}{P_{im}(t)}, RPM\right),$$

is a calibrated 3D lookup table having entries representing standard gas flow through the engine intake port 25;

$$f_{exh}^{std}\left(\frac{P_{at}(t)}{P_{em}(t)}\right)$$

is a calibrated 3D lookup table having entries representing standard gas flow through the engine exhaust manifold 29;

$$f_{prg}^{std}\left(\frac{P_{im}(t)}{P_{ec}(t)}\right)$$

is a calibrated 3D lookup table having entries representing standard gas flow through the purge solenoid valve 53;

$$f_{rol}^{std}\left(\frac{P_{ec}(t)}{P_{ft}(t)}\right)$$

is a calibrated 2D lookup table having entries representing standard gas flow through the rollover orifice 92; and $$f_{vnt}^{std}\left(\frac{P_{ec}(t)}{P_{at}(t)}\right)$$

is a calibrated 2D lookup table having entries representing standard gas flow through the canister vent valve 67. Additionally, h is the iteration rate of block 412 (which may be, for example, one iteration every five to ten milliseconds), $K_{lv}$ is a calibrated gain, and density correction values $C_p(.)$, and $C_t(.)$ are determined with standard 2D lookup tables having entries of correction values stored as a function of upstream gas pressure in a Cp lookup table, and as a function of upstream gas temperature in a Ct lookup table.

At block 414, the flow estimates from block 412 are combined to determine the net flow of each node of interest within the engine system 10. The net gas flow through the intake manifold 23 $f_{im}^{net}(t)$ is determined as $$f_{im}^{net}(t)=f_{thr}(t)+f_{iac}(t)+f_{egr}(t)+f_{prg}(t)-f_{eng}(t).$$

The net gas flow through the exhaust manifold 29 $f_{em}^{net}(t)$ is determined as $$f_{em}^{net}(t)=f_{eng}(t)-f_{exh}(t)-f_{egr}(t).$$

The net gas flow through the evaporative canister 65 $f_{ec}^{net}(t)$ is determined as $$f_{ec}^{net}(t)=f_{rol}(t)-f_{prg}(t)-f_{vnt}(t).$$

The net gas flow through the fuel tank 75, $f_{ft}^{net}(t)$ is determined as $$f_{ft}^{net}(t)=f_{lv}-f_{rol}.$$

The net flow and pressure estimate information is next applied at block 416 to update pressure change estimates at the intake manifold 23, exhaust manifold 29, evaporative canister 65 and fuel tank 75 through the following respective equations:

$$\dot{P}_{im}(t) = \begin{cases} C_{im} \cdot f_{im}^{net}(t) + L_{im} \cdot [MAP(t) - P_{im}^m(t)] & \text{if } P_{im}(t) < B_{im}^{ub} \cdot P_{at}(t) \\ 0 & \text{if } P_{im}(t) > B_{im}^{ub} P_{at}(t) \end{cases},$$

$$\dot{P}_{em}(t) = C_{em} f_{em}^{net}(t) + L_{em}[MAP(t) - P_{im}(t)],$$

$$\dot{P}_{ec}(t) = K_{ec} \cdot f_{ec}^{net}, \text{ and}$$

$$\dot{P}_{ft}(t) = K_{ft} \cdot f_{ft}^{net} + L_{ft}[FP - P_{ft}(t)],$$

In the above equations, $C_{im}$ is an intake manifold pneumatic capacitance, determined as $$C_{im} = \frac{RT_{im}(t)}{V_{im}},$$

in which R is the generally-known universal gas constant, $T_{im}(t)$ is estimated or measured intake manifold gas temperature at time t, and $V_{im}$ is measured intake manifold volume, $C_{em}$ is an exhaust manifold pneumatic capacitance, determined as $$C_{em} = \frac{RT_{em}(t)}{V_{em}}$$

in which $T_{em}(t)$ is estimated or measured exhaust manifold gas temperature at time t, $V_{em}$ is measured exhaust manifold volume, $L_{im}$ is an intake manifold state estimator gain, which is a system-specific value established through a conventional calibration procedure, $L_{em}$ is an exhaust manifold state estimator gain, which is a system-specific value established through a conventional calibration procedure, $B_{im}^{ub}$ is a multiplicative constant defining an upper bound on the intake manifold pressure estimate, set to about 0.95 in this embodiment, and $K_{ec}$, $K_{ft}$, and $L_{ft}$ are system-specific calibrated gains.

The pressure changes estimated at block 416 are integrated at block 418, such as through the conventional application of the Euler Numerical Integration Algorithm, to yield pressure estimates at various nodes of the engine system 10, as follows:

$$P_{im}(t+h)=\dot{P}_{im}(t)+h\cdot P_{im}(t)$$

$$P_{em}(t+h)=\dot{P}_{em}(t)+h\cdot P_{em}(t)$$

$$P_{ec}(t+h)=\dot{P}_{ec}(t)+h\cdot P_{ec}(t)$$

$$P_{ft}(t+h)=\dot{P}_{ft}(t)+h\cdot P_{ft}(t)$$

in which h is the update rate of block 418, which may be five to ten milliseconds as mentioned above. The pressure estimates are subject to certain instabilities, for example due to the relatively granular iteration rate h, which is selected as the highest iteration rate that can be tolerated within the throughput constraints and competing priorities the Controller 214 so as to provide as much estimation stability as possible.

According to the second embodiment of this invention, the barometric pressure is then estimated at block 420 as described above in reference to the block diagram of FIGS. 3-6, using the determined flows $f_{prg}(t)$, $f_{egr}(t)$ and $f_{eng}(t)$ is to estimate the intake mass air flow $MAF_{int}$. A flow diagram corresponding to such block diagram is depicted in FIG. 9, where blocks 424 and 426 are first executed to generate the intake system flow estimate $MAF_{int}$ as described above in reference to FIG. 6 according to the equation:

$$MAF_{int}=f_{eng}(t)-f_{egr}(t)-f_{prg}(t)$$

and to compute the corresponding flow term FT=[MAF$_{int}$ (R*T$_{AT}$)$^{1/2}$]/MAP, using the measured air temperature T$_{AT}$ and manifold pressure MAP. Block 428 then determines the intake effective area A$_{int}$ as described above in reference to FIG. 3, using the 2D lookup tables 236 and 238, and combining the throttle and idle air control values. Block 430 then determines the pressure ratio P$_{AT}$/MAP as a 3D lookup table function of FT and A$_{int}$, and block 432 determines the instantaneous barometric pressure estimate BPE$_{new}$ based on the product of P$_{AT}$/MAP and MAP. If the steady state flag conditions described above in reference to FIG. 4 are satisfied, as determined at block 434, the block 436 is executed to compute the filtered term BPE$_f$ based on BPE$_{new}$ and BPE$_{out}$. Otherwise, the current value of BPE$_{out}$ is retained, as indicated at block 438.

Referring back to FIG. 8, the block 440 is then executed to suitably bound the pressure estimates. In particular, the estimates are bounded as follows:

P$_{im}$(t+h) may be bounded on an upper magnitude bound by a pressure maximum of MAP or of a percentage, such as ninety-five percent, of 30 atmospheric pressure, and may be bounded on a lower magnitude bound by a pressure minimum of 10 kPa.;

P$_{em}$(t+h) may be bounded, if determined to be in an unstable region substantially close to atmospheric pressure, by restricting the change in estimated exhaust manifold pressure from one update to the next, to a predetermined percentage of the net gas flow through the exhaust manifold as determined at block 414, and may in any case be limited to no lower a pressure than atmospheric pressure;

P$_{ec}$(t+h) and P$_{ft}$(t+h) are bounded between pre-set pressure limit values, which may be established as system-specific calibrated values; and P$_{at}$(t+h) is bounded as described above in reference to blocks 272 and 274 of FIG. 5.

The block 442 is then executed to store the updated temperature, pressure and flow values are then stored in a memory of the Controller 214 as the most recent temperature, pressure and flow information for use in engine system control and diagnostic operations, and for use in the next iteration of the interrupt routine during which such stored values are updated in the manner described for steps 402–420. Conventional engine control and diagnostic operations are then carried out at block 444. Such operations include, for example, operations to determine and provide for issuance of a fuel injector drive command to fuel injector 87 as a function of the estimated gas flow rate along flow branch F$_5$, an idle air command to bypass valve 60 as a function of manual operator input and estimated gas flow into the intake manifold via flow path F$_4$, a canister purge valve position command for the canister purge valve 53 as a function of estimated gas flow rate along flow branch F$_{10}$, an EGR position command to EGR valve 41 as a function of gas flow along flow branch F$_8$, etc. Conventional diagnostic operations, such as operations to diagnose operability of elements 19, 60, 41, 67, and 92 may further be carried out at the step 426 using the temperature, pressure and flow information determined through the operations of FIG. 8.

In summary, this invention provides an engine control with a model-based estimation of barometric pressure that, in a first embodiment eliminates the necessity of a barometric pressure sensor, and in a second embodiment eliminates the necessity of both a barometric pressure sensor and a mass air flow sensor. The model-based nature of the control significantly simplifies the calibration effort, as the required lookup table may be calibrated at any altitude. Although described in reference to the illustrated embodiment, it will be understood that various modifications may be made to the subject control without departing from the intended and proper scope of the invention. By way of example, the control may be applied to engine systems having different or additional airflow components than shown in FIG. 1. By way of further example, the mass airflows needed to estimate the intake airflow MAF$_{int}$ according to the second embodiment of this invention may be determined in a different manner than described herein. Accordingly, it will be understood that systems and controls incorporating these and other modifications may fall within the scope of this invention, which is defined by the appended claims.

We claim:

1. A method of operation for an internal combustion engine system having an intake system that receives air at barometric pressure, comprising the steps of:

measuring an air pressure at a downstream side of said intake system;

determining a mass air flow through said intake system;

determining an effective area of said intake system;

determining a temperature of the received air;

applying the measured air pressure, the determined mass air flow, the determined effective area and the determined air temperature to a mathematical model of the intake system to estimate a pressure ratio across said intake system;

computing a barometric pressure value according to a product of the estimated pressure ratio and the measured air pressure;

developing an engine system control command as a function of the computed barometric pressure value; and controlling engine system operation in accordance with the developed control command.

2. The method of operation set forth in claim 1, wherein the intake system includes a throttle valve, and the method includes the steps of:

measuring a position of said throttle valve; and determining the effective area of said intake system as a function of said measured position.

3. The method of operation set forth in claim 1, wherein the intake system includes a throttle valve and an idle air valve bypassing said throttle valve, and the method includes the steps of:

determining a position of said throttle valve and a position of said idle air valve;

determining an effective area of said throttle valve as a function of the determined position of said throttle valve;

determining an effective area of said idle air valve as a function of the determined position of said idle air valve; and determining the effective area of said intake system according to a sum of the determined effective areas of said throttle valve and said idle air valve.

4. The method of operation set forth in claim 1, wherein the step of estimating the pressure ratio across said intake system includes the steps of:

determining the effective area of said intake system;

determining an airflow parameter based on the measured air pressure, the determined mass air flow, and the determined air temperature;

estimating the pressure ratio as a function of the determined effective area and the determined airflow parameter.

5. The method of operation set forth in claim 1, wherein the step of determining the mass air flow through said intake system includes the step of measuring the mass air flow through said intake system.

6. The method of operation set forth in claim 1, wherein the engine system includes an exhaust system and an EGR system for returning exhaust system gases to said intake system, and step of determining the mass air flow through said intake system includes the steps of: determining a gas flow out of said intake system;

determining a gas flow through said EGR system; and determining the mass air flow through said intake system according to a difference between the determined gas flow out of the intake system and the determined gas flow through said EGR system.

7. The method of operation set forth in claim 1, wherein the engine system includes an exhaust system, an EGR system for returning exhaust system gases to said intake system, a fuel vapor canister and a fuel vapor purge system for supplying fuel vapor from said canister to said intake system, and the step of determining the mass air flow through said intake system includes the steps of:

determining a gas flow out of said intake system;

determining a gas flow through said EGR system determining a fuel vapor flow through said vapor purge system; and    determining the mass air flow through said intake system according to the determined gas flow out of the intake system, less the determined gas flow through said EGR system, less the determined vapor flow through said vapor purge system.

8. The method of operation set forth in claim 1, including the step of developing an engine system control command as a function of the computed barometric pressure value includes the steps of:

repeatedly computing the barometric pressure value;

computing a filtered estimate of the barometric pressure based on a prior estimate of barometric pressure and a newly computed barometric pressure value;

developing the engine system control command as a function of the filtered estimate of barometric pressure when said engine system is in a steady state mode of operation; and    developing the engine system control command as a function of the prior estimate of barometric pressure when said engine system is not in said steady state mode of operation.

9. The method of operation set forth in claim 8, wherein:

the step of estimating the pressure ratio across said intake system includes the steps of:

determining the effective area of said intake system;

determining an airflow parameter based on the measured air pressure, the determined mass air flow, and the determined air temperature; and       estimating the pressure ratio as a function of the determined effective area and the determined airflow parameter; and    the mode of operation of said engine system is determined based on detected rates of change of the determined effective area and the determined airflow parameter.

10. A control system for an internal combustion engine control system having an intake system that receives air at barometric pressure, comprising:

means for measuring an air pressure at a downstream side of said intake system;

means for determining a mass air flow through said intake system;

means for determining an effective area of said intake system;

means for determining a temperature of the received air;

a microprocessor controller comprising means for applying the measured air pressure, the determined mass air flow, the determined effective area and the determined air temperature to a mathematical model of the intake system to estimate a pressure ratio across said intake system, means for computing an barometric pressure value according to a product of the estimated pressure ratio and the measured air pressure, means for developing an engine system control command as a function of the computed barometric pressure value; and    at least one engine actuator controlled in response to the developed control command.

\* \* \* \* \*